UNITED STATES PATENT OFFICE.

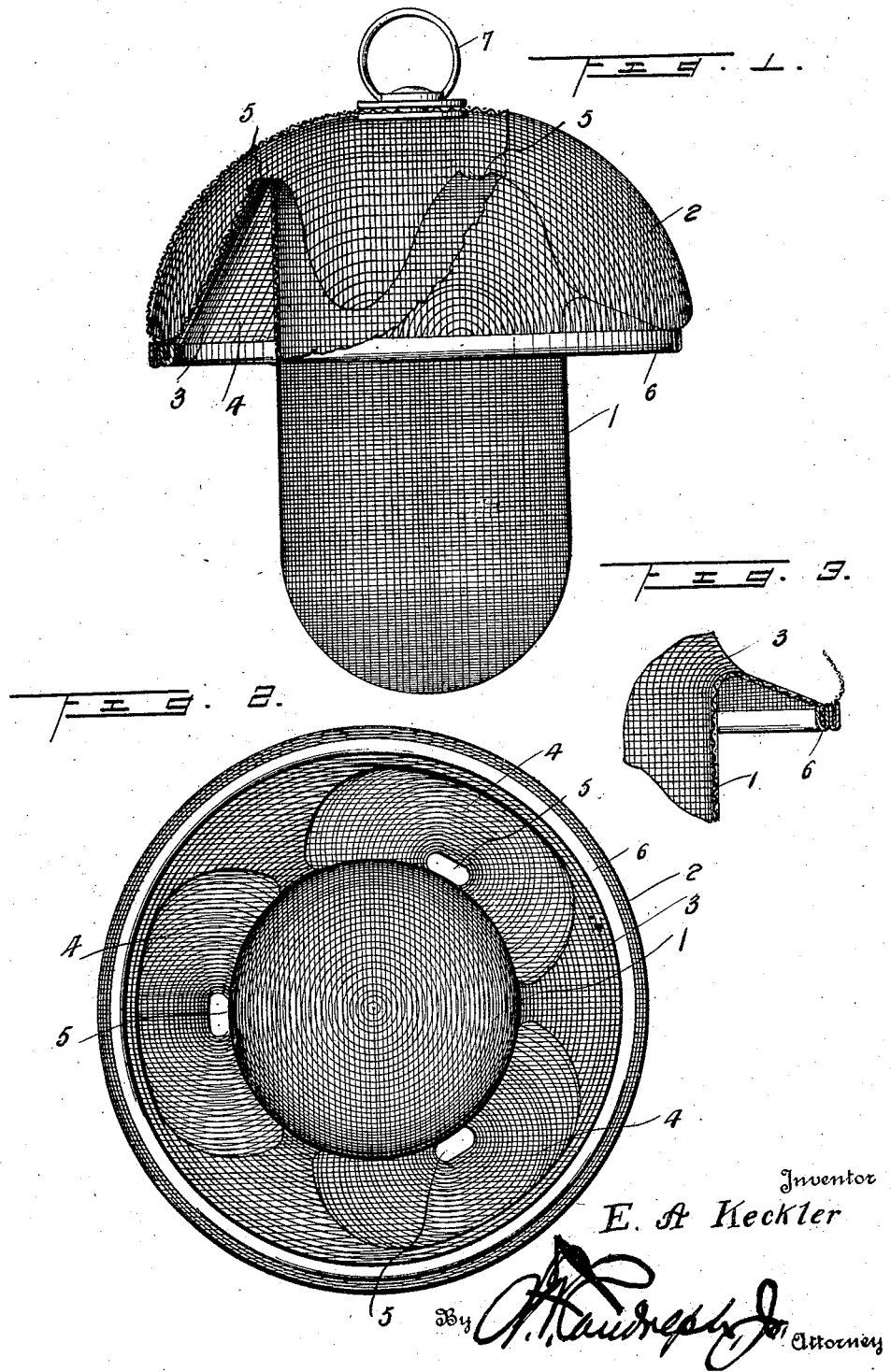

EARL A. KECKLER, OF BRILLIANT, OHIO.

HANGING FLYTRAP.

1,419,859.　　　Specification of Letters Patent.　Patented June 13, 1922.

Application filed March 7, 1921. Serial No. 450,381.

*To all whom it may concern:*

Be it known that I, EARL A. KECKLER, a citizen of the United States, residing at Brilliant, in the county of Jefferson and State of Ohio, have invented certain new and useful Improvements in Hanging Flytraps; and I do hereby declare the following to be a full, clear, and exact description of the invention, such as will enable others skilled in the art to which it appertains to make and use the same.

The purpose of this invention is to rid dwellings, places of public assemblage, factories and like frequented places of winged insects, such as flies, mosquitoes, gnats and the like.

In accordance with this invention, a receptacle having the general appearance of an acorn is provided and adapted to be suspended in the place to be cleared of flies or other insects, the upper portion of the receptacle being enlarged and the enlargement having a plurality of upwardly extending funnel-shaped passages opening at their points into the receptacle.

Other objects and advantages will be apparent and suggest themselves as the nature of the invention is understood.

While the drawings illustrate an embodiment of the invention it is to be understood that in adapting the same to meet different conditions and requirements, various changes in the form, proportion and minor details of construction may be resorted to without departing from the nature of the invention.

Referring to the accompanying drawings forming a part of the specification,

Figure 1 is an elevation of a fly trap embodying the invention, parts being broken away, Figure 2 is a view of the trap inverted, and Figure 3 is a sectional detail of the body of the trap, the cover being omitted.

Corresponding and like parts are referred to in the following description and designated in the several views of the drawings by like reference characters.

The trap comprises a body 1 and a top or cover 2. The upper portion of the trap is enlarged and the top or cover 2 approximates the shape of a mushroom. The body 1 is of conical form. A skirt 3 encircles the upper portion of the body 1 and is interposed between the same and the lower edge of the top or cover 2. The skirt 3 preferably forms a part of the body 1. The skirt 3 is fluted or waved to provide a plurality of funnel-shaped passages 4 which extend upwardly and are open at their points, as indicated at 5. The funnel-shaped passages 4 are exterior to the body 1 and beneath the overhanging portion of the top or cover 2 so as to facilitate upward movement of the insects which become entrapped after passing through the openings 5. The parts of the trap are preferably constructed of wire fabric such as commonly employed in the manufacture of fly screens. The top or cover 2 may be of any desired material best adapted for the purpose. A metal binding 6 reinforces the edges of the wire fabric. A ring 7 is applied centrally to the top or cover 2 for convenience of suspending the trap from a suitable support.

From the foregoing taken in connection with the accompanying drawings, it will be readily understood that the trap presents the general appearance of an acorn and is suspended with the shell or enlarged portion uppermost and the funnel-shaped passages 4 underlying the overhanging portion of the top or cover so as to direct the insects upwardly into the trap through the openings 5 and thereby prevent escape because of the natural tendency of the insects to crawl upwardly and not pass downwardly through the openings 5. The entrapped insects may be destroyed in any manner and are removed from the trap after the top or cover 2 has been displaced.

What is claimed is:

1. An insect trap of the character specified, comprising a body of approximately conical form, a mushroom shaped top having its central portion extending over and its outer portion overhanging and surrounding the upper portion of the body, and an element between the upper portion of the body and the overhanging and surrounding portion of the top and crimped to form a plurality of funnel shaped passages which are open at their apices.

2. A fly trap of the character specified, comprising a conical body, a mushroom-shaped top, and a flared skirt disposed between the upper edge of the body and the lower edge of the top and fluted or waved to provide a plurality of funnel-shaped passages which extend upwardly and are provided at their points with openings leading into the trap.

3. A hanging insect trap, comprising a conical body, a skirt surrounding the upper portion of the body and forming a part thereof, and fluted or waved to provide a plurality of funnel-shaped passages having openings at their points, and a mushroom-shaped cover receiving the upper portion of the body and having detachable connection with the skirt thereof and provided with suspending means.

In testimony whereof I affix my signature in presence of two witnesses.

EARL A. KECKLER.

Witnesses:
HARRY B. COX,
CLARA M. COX.